US011131458B2

(12) United States Patent
Prociw et al.

(10) Patent No.: US 11,131,458 B2
(45) Date of Patent: Sep. 28, 2021

(54) FUEL INJECTORS FOR TURBOMACHINES

(71) Applicant: Delavan, Inc., West Des Moines, IA (US)

(72) Inventors: Lev Alexander Prociw, Johnston, IA (US); Jason A. Ryon, Carlisle, IA (US); Gregory A. Zink, Des Moines, IA (US)

(73) Assignee: Delavan Inc., West Des Moines, IA (US)

( * ) Notice: Subject to any disclaimer, the term of this patent is extended or adjusted under 35 U.S.C. 154(b) by 396 days.

(21) Appl. No.: 15/949,779

(22) Filed: Apr. 10, 2018

(65) Prior Publication Data
US 2019/0309948 A1 Oct. 10, 2019

(51) Int. Cl.
| | |
|---|---|
| *F23R 3/60* | (2006.01) |
| *F23R 3/28* | (2006.01) |
| *F23R 3/00* | (2006.01) |
| *F23R 3/46* | (2006.01) |
| *F02C 7/20* | (2006.01) |
| *F02C 7/22* | (2006.01) |
| *F23C 5/02* | (2006.01) |

(52) U.S. Cl.
CPC .............. *F23R 3/28* (2013.01); *F02C 7/20* (2013.01); *F02C 7/222* (2013.01); *F23C 5/02* (2013.01); *F23R 3/002* (2013.01); *F23R 3/283* (2013.01); *F23R 3/286* (2013.01); *F23R 3/46* (2013.01); *F23R 3/60* (2013.01); *F23D 2211/00* (2013.01)

(58) Field of Classification Search
CPC .. F02C 7/222; F02C 7/20; F23R 3/283; F23R 3/60
See application file for complete search history.

(56) References Cited

U.S. PATENT DOCUMENTS

| | | | | |
|---|---|---|---|---|
| 3,159,971 A | * | 12/1964 | Moebius | ................. F23R 3/283 |
| | | | | 60/740 |
| 3,972,182 A | * | 8/1976 | Salvi | ..................... F23D 11/105 |
| | | | | 60/743 |

(Continued)

FOREIGN PATENT DOCUMENTS

| | | | | |
|---|---|---|---|---|
| CA | 2934096 A1 | * | 1/2017 | ................ F23R 3/60 |
| EP | 1811229 A2 | | 7/2007 | |
| EP | 2182290 A1 | | 5/2010 | |

OTHER PUBLICATIONS

The extended European search report issued in the corresponding EP patent application No. 19168469.5, dated Jul. 24, 2019.

*Primary Examiner* — Gerald L Sung
*Assistant Examiner* — Marc J Amar
(74) *Attorney, Agent, or Firm* — Locke Lord LLP; Daniel J. Fiorello; Gabrielle L. Gelozin

(57) ABSTRACT

A fuel injector for a multipoint injection system can include a body defining an air cavity for allowing air to flow therethrough and an interior cavity. A fuel is tube disposed at least partially within the interior cavity of the body. The fuel tube can include a first end configured to connect to a fuel injector connector of a fuel manifold, and a second end configured to connect to a fuel distributor of the fuel injector, wherein the fuel injector is configured to be disposed at least partially in a combustor dome. The fuel tube is configured to move in an axial direction to allow flexibility between the fuel manifold and the combustor dome.

16 Claims, 21 Drawing Sheets

(56) References Cited

U.S. PATENT DOCUMENTS

| | | | | |
|---|---|---|---|---|
| 4,255,116 A * | 3/1981 | Zwick | F23D 11/443 | 431/10 |
| 4,258,544 A * | 3/1981 | Gebhart | F02C 7/222 | 60/742 |
| 4,454,711 A * | 6/1984 | Ben-Porat | F23R 3/60 | 60/800 |
| 4,735,044 A * | 4/1988 | Richey | F02C 7/22 | 239/424 |
| 5,211,005 A * | 5/1993 | Hovnanian | F02C 7/22 | 60/739 |
| 5,279,112 A * | 1/1994 | Halila | F02M 37/0017 | 285/13 |
| 5,323,604 A | 6/1994 | Ekstedt et al. | | |
| 5,361,578 A | 11/1994 | Donlan | | |
| 5,528,903 A * | 6/1996 | Schreckling | A63H 27/06 | 60/736 |
| 6,212,870 B1 * | 4/2001 | Thompson | F23R 3/14 | 60/746 |
| 6,523,350 B1 | 2/2003 | Mancini et al. | | |
| 8,281,595 B2 * | 10/2012 | Davis, Jr. | F23D 14/82 | 60/747 |
| 8,443,608 B2 * | 5/2013 | Williams | F23R 3/36 | 60/740 |
| 2004/0129001 A1 | 7/2004 | Lehtinen | F23D 11/107 | 60/740 |
| 2004/0261419 A1 * | 12/2004 | McCaffrey | F23M 5/04 | 60/796 |
| 2007/0180809 A1 * | 8/2007 | Bessagnet | F23R 3/60 | 60/39.01 |
| 2008/0308654 A1 * | 12/2008 | Pelletier | F23R 3/286 | 239/494 |
| 2010/0018208 A1 | 1/2010 | Ritland | | |
| 2010/0307161 A1 * | 12/2010 | Thomson | F23D 11/107 | 60/748 |
| 2011/0038715 A1 * | 2/2011 | Frank | F01D 17/165 | 415/159 |
| 2012/0167544 A1 * | 7/2012 | Toronto | F23R 3/16 | 60/39.52 |
| 2012/0234944 A1 * | 9/2012 | Overman | F23D 11/106 | 239/553.5 |
| 2013/0189115 A1 * | 7/2013 | Everett | C23C 14/042 | 416/241 R |
| 2014/0075949 A1 * | 3/2014 | Prociw | F23R 3/346 | 60/740 |
| 2014/0339339 A1 * | 11/2014 | Prociw | F23D 11/107 | 239/406 |
| 2015/0135716 A1 * | 5/2015 | Ginessin | F23R 3/286 | 60/737 |
| 2016/0290291 A1 * | 10/2016 | Prociw | F02C 7/22 | |
| 2017/0138266 A1 * | 5/2017 | Caples | B23P 15/00 | |
| 2017/0261209 A9 * | 9/2017 | Ginessin | F23R 3/36 | |
| 2018/0163965 A1 * | 6/2018 | Le Pannerer | F23R 3/283 | |
| 2018/0363908 A1 * | 12/2018 | Graham | F23R 3/343 | |
| 2019/0120141 A1 * | 4/2019 | Ryon | F02C 7/232 | |
| 2019/0249869 A1 * | 8/2019 | Glover | F23R 3/283 | |
| 2019/0249877 A1 * | 8/2019 | Fryer | F23R 3/283 | |

\* cited by examiner

FUEL INJECTORS FOR TURBOMACHINES

BACKGROUND

1. Field

The present disclosure relates to turbomachines, more specifically to fuel nozzle manifold systems for turbomachines.

2. Description of Related Art

Fuel nozzles traditionally connect fuel manifolds located outside the gas turbine engine to the combustor located inside the engine. As a result of this arrangement, they are heavy and severely limited in size and number. These factors limit the ability to produce an optimal fuel-air mixture/gas temperature for the turbine and for emissions control. Traditional systems have cause a work load on the combustor which itself can limit how much mixing can be achieved and can be prone to durability issues. Traditional engine design has utilized a fuel manifold external to the engine and floating air seals to seal the fuel nozzles to the combustor.

Such conventional methods and systems have generally been considered satisfactory for their intended purpose. However, there is still a need in the art for improved fuel nozzle systems. The present disclosure provides a solution for this need.

SUMMARY

A fuel injector for a multipoint injection system can include a body defining an air cavity for allowing air to flow therethrough and an interior cavity. A fuel is tube disposed at least partially within the interior cavity of the body. The fuel tube can include a first end configured to connect to a fuel injector connector of a fuel manifold, and a second end configured to connect to a fuel distributor of the fuel injector, wherein the fuel injector is configured to be disposed at least partially in a combustor dome. The fuel tube is configured to move in an axial direction to allow flexibility between the fuel manifold and the combustor dome.

The fuel tube can be a coiled fuel tube. The coiled fuel tube can be configured to axially compress and/or expand between the first end and the second end. The coiled tube can be contained within the interior cavity of the fuel injector.

The body can be formed from an outer heat shield and an inner heat shield disposed within the outer heat shield. The inner heat shield can at least partially define the air cavity. The outer heat shield and the inner heat shield can be integrally formed together. In certain embodiments, the outer heat shield and the inner heat shield can be separate components. The interior cavity can be formed between the outer heat shield and the inner heat shield such that the coiled tube is disposed between the outer heat shield and the inner heat shield.

The outer heat shield can include one or more standoff features for orienting the fuel injector on the combustor dome (e.g., to align with a fuel injector connector of a fuel manifold). The one or more standoff features can include three standoff features. The fuel distributor can be disposed at least partially within the interior cavity.

A fuel injector system can include a fuel manifold, a combustor dome mounted to the fuel manifold with one or more retainer rings, and a plurality of fuel injectors disposed in the combustor dome, each fuel injector connected to a fuel injector connector of the fuel manifold and configured to mix air and fuel. The fuel injectors can be as disclosed herein.

The combustor dome can be mounted to the fuel manifold with two retaining rings which presses against the combustor dome to provide positive force to engage each fuel injector tube with each fuel injector connector of the manifold. The two retainer rings can include combustor seals.

A combustor liner can be disposed between the retainer rings in contact with the combustor seals. The plurality of fuel injectors can be disposed in a plurality of circumferential rows to allow radial fuel staging.

Each fuel injector can be disposed in a radially outward row and radially inward row are angled relative to an axial axis to effuse fuel and air into the combustor liner parallel to or away from walls of the combustor liner to prevent impingement on the walls of the combustor liner.

Each of the fuel injectors include one or more standoff features configured to mate with one or more locator apertures defined in the combustor dome to orient each fuel injector on the combustor dome to such that each fuel injector aligns with each fuel injector connector. The plurality of fuel injectors includes about 90 or more fuel injectors.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
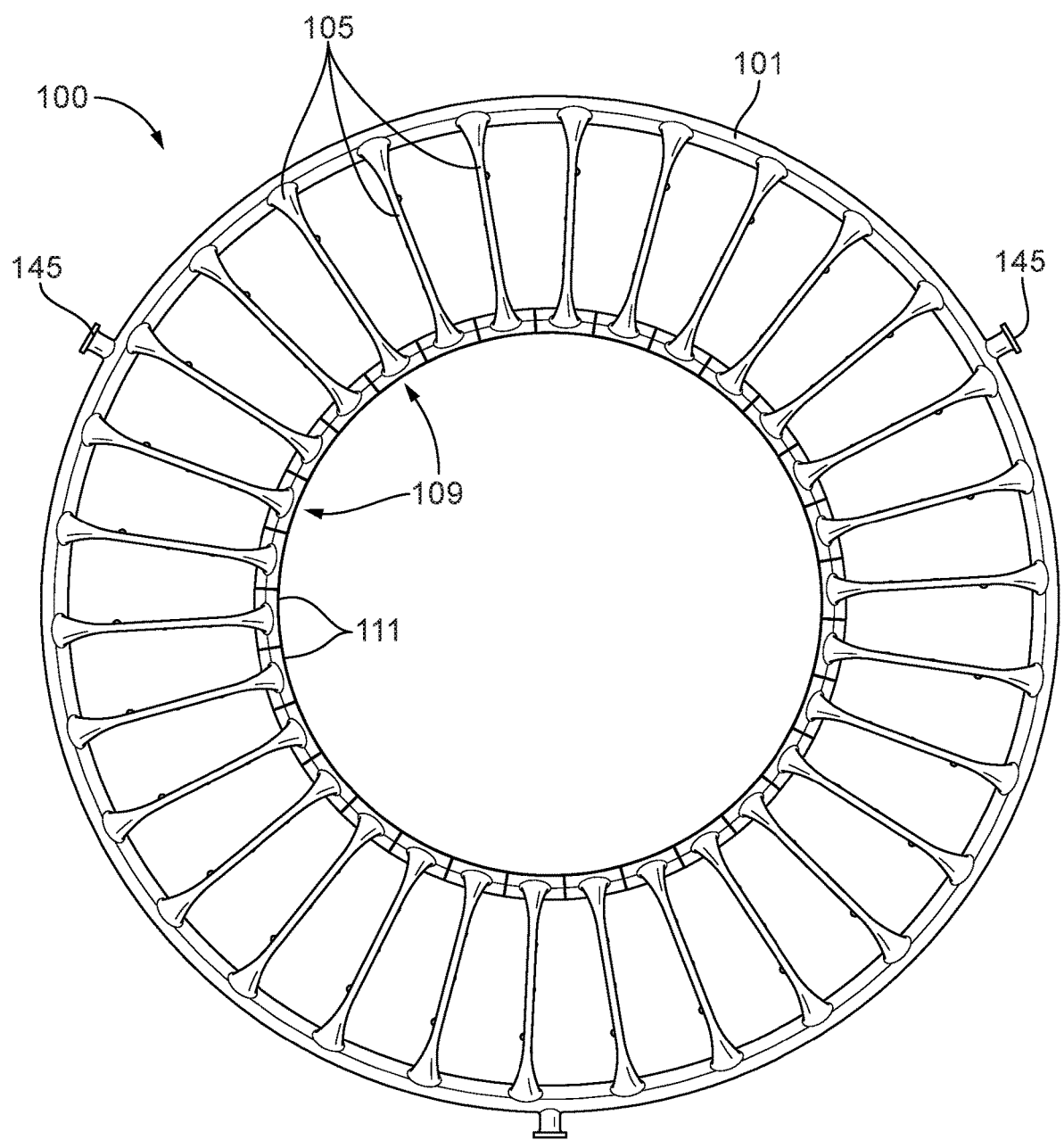
FIG. 1 is a forward plan view of an embodiment of an internal fuel manifold in accordance with this disclosure.

Reference will now be made to the drawings wherein like reference numerals identify similar structural features or aspects of the subject disclosure. For purposes of explanation and illustration, and not limitation, an illustrative view of an embodiment of a fuel manifold in accordance with the disclosure is shown in FIG. 1 and is designated generally by reference character 100. Other embodiments and/or aspects of this disclosure are shown in FIGS. 2-21.

Figure 2:
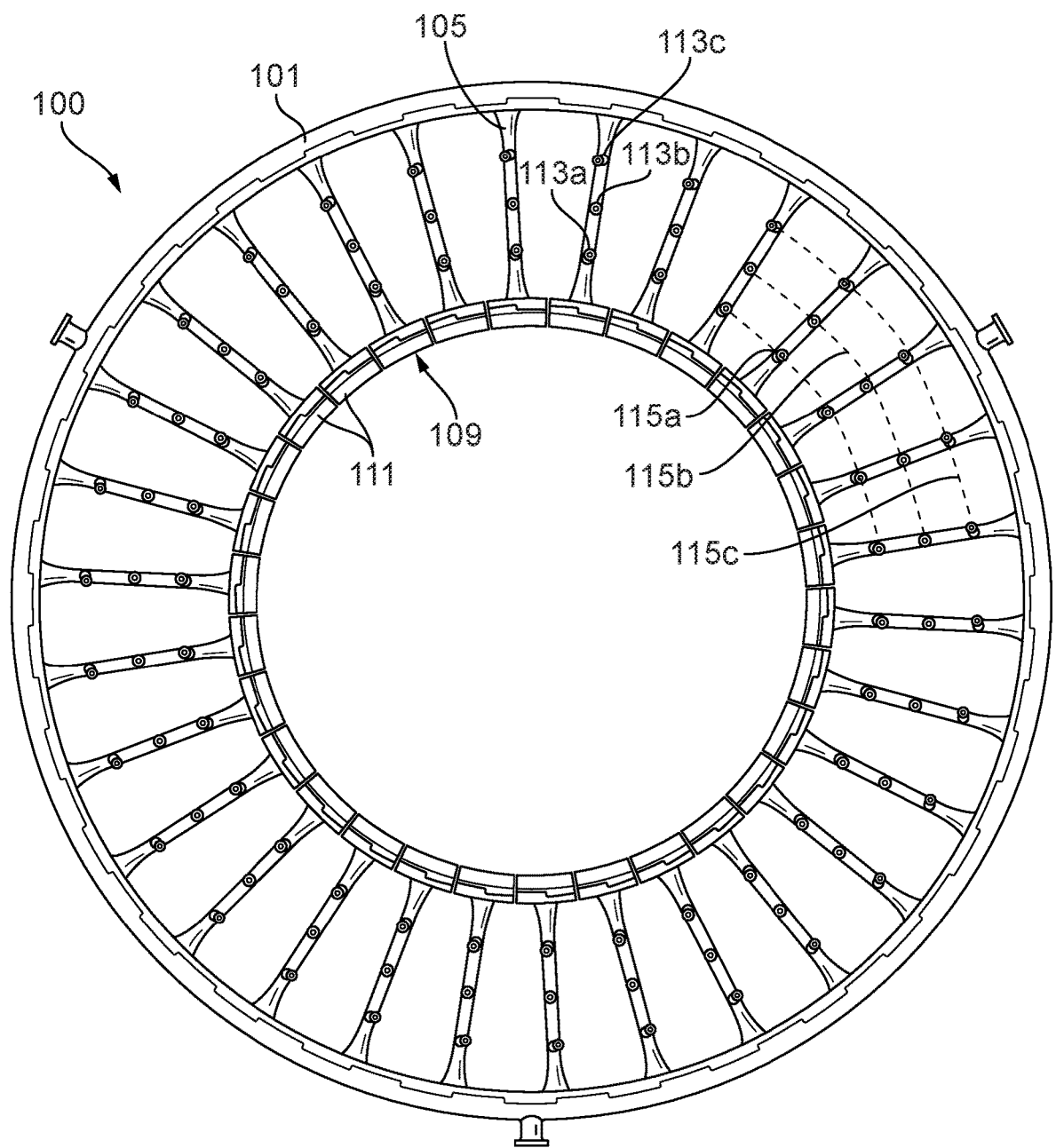
FIG. 2 is an aft plan view of the internal fuel manifold of FIG. 1.
Figure 3:
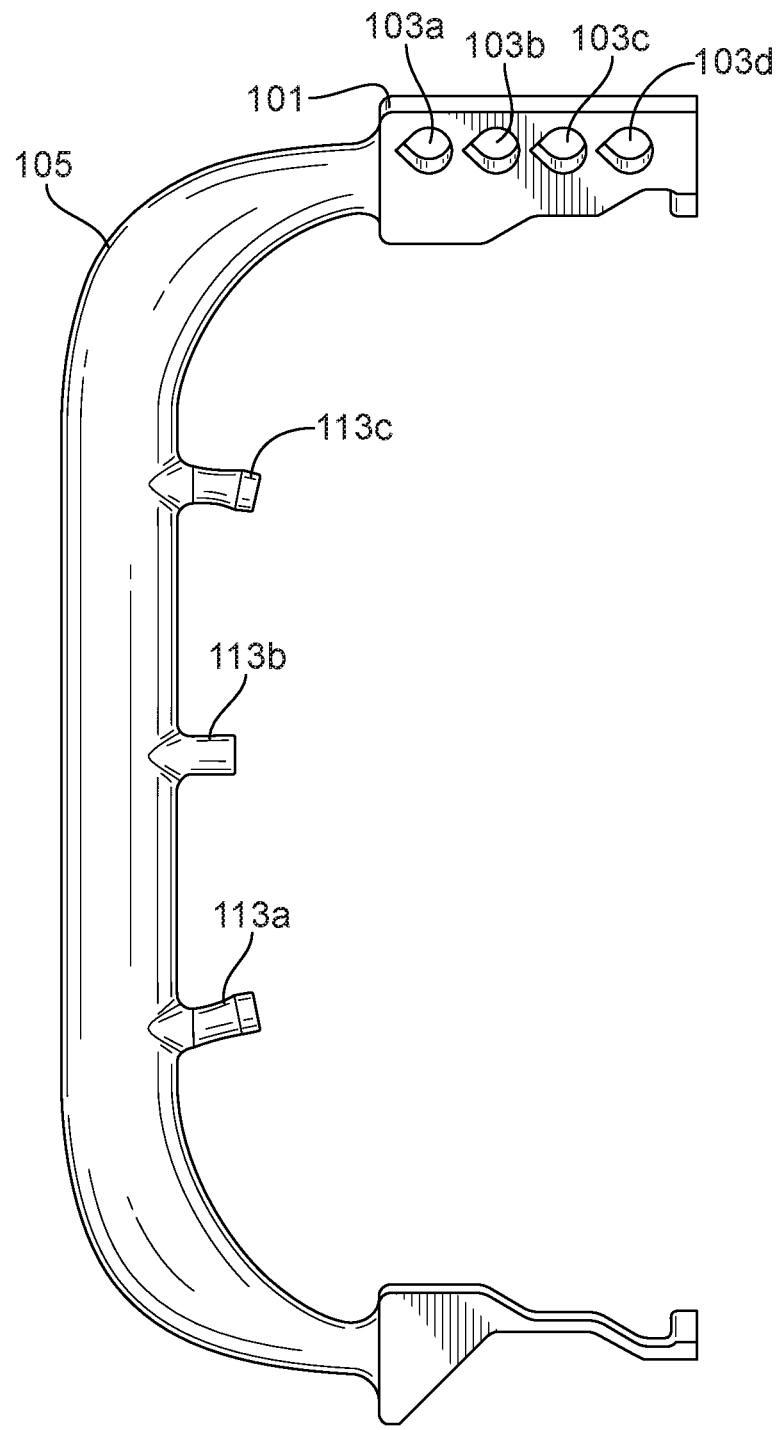
FIG. 3 is a side elevation view of a cutaway section of the embodiment of FIG. 1, showing an isolated fuel branch thereof.

Referring to FIGS. 1 and 2, an internal fuel manifold 100 for a turbomachine (not shown) can include an outer ring 101. Referring additionally to FIG. 3, the outer ring 101 defines one or more fuel supply channels 103a, 103b, 103c, 103d configured to allow fuel flow around at least a portion of a circumference of the outer ring 101.

Figure 4:
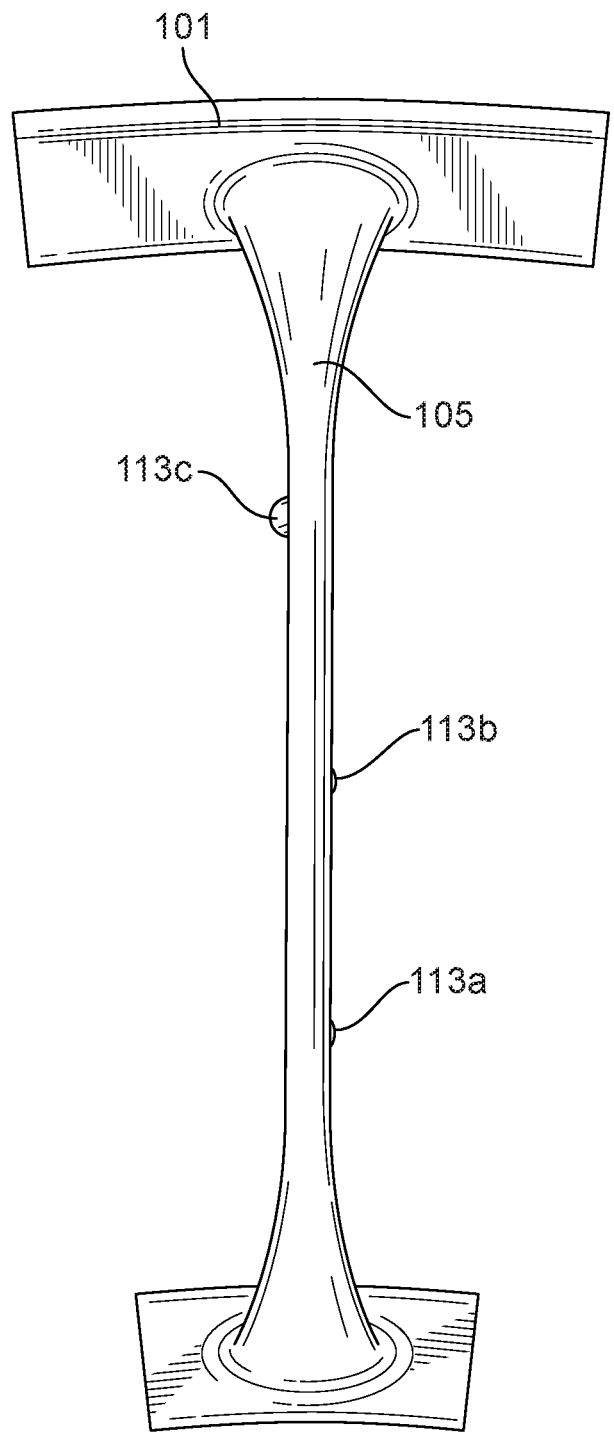
FIG. 4 is a forward view of the cutaway section of FIG. 3.
Figure 5:
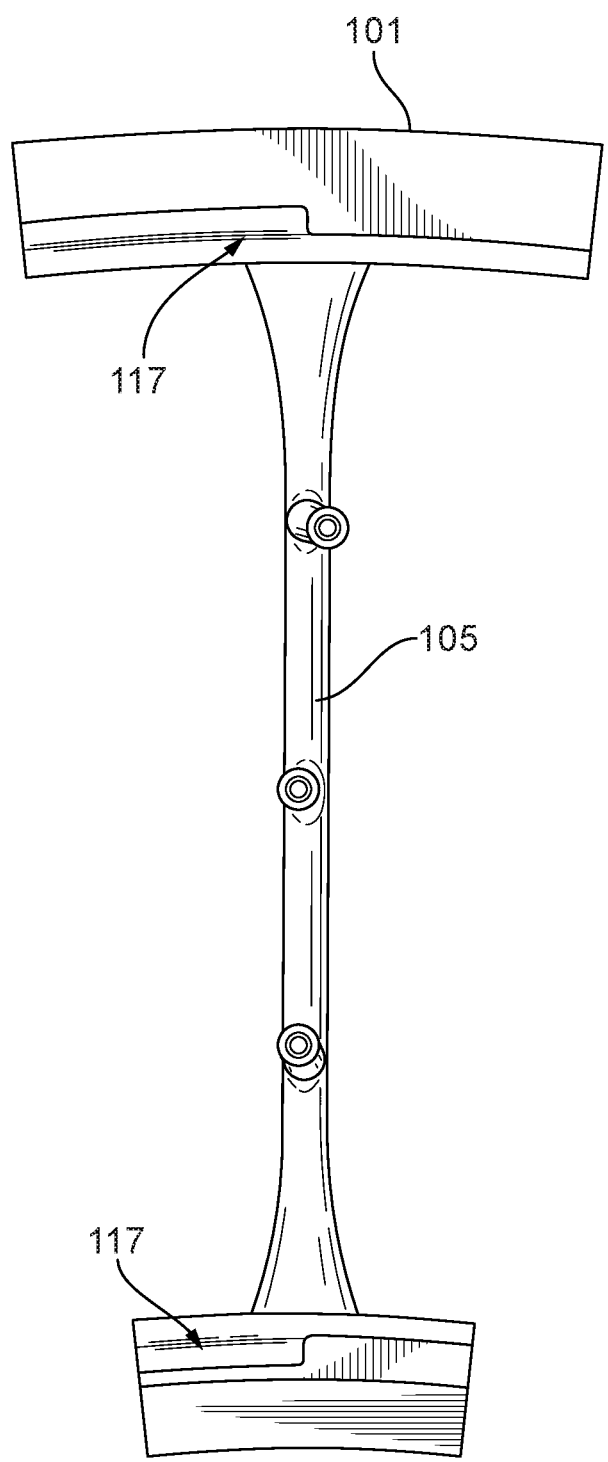
FIG. 5 is an aft view of the cutaway section of FIG. 3.

Referring additionally to FIGS. 4 and 5, the manifold 100 includes a plurality of injector branches 105 extending radially inward from the outer ring 101. The injector branches 105 include a high aspect ratio shape. For example, as shown, the injector branches 105 can be thin (e.g., in the circumferential direction of outer ring 101) to reduce blockage of airflow therethrough.

Figure 6:
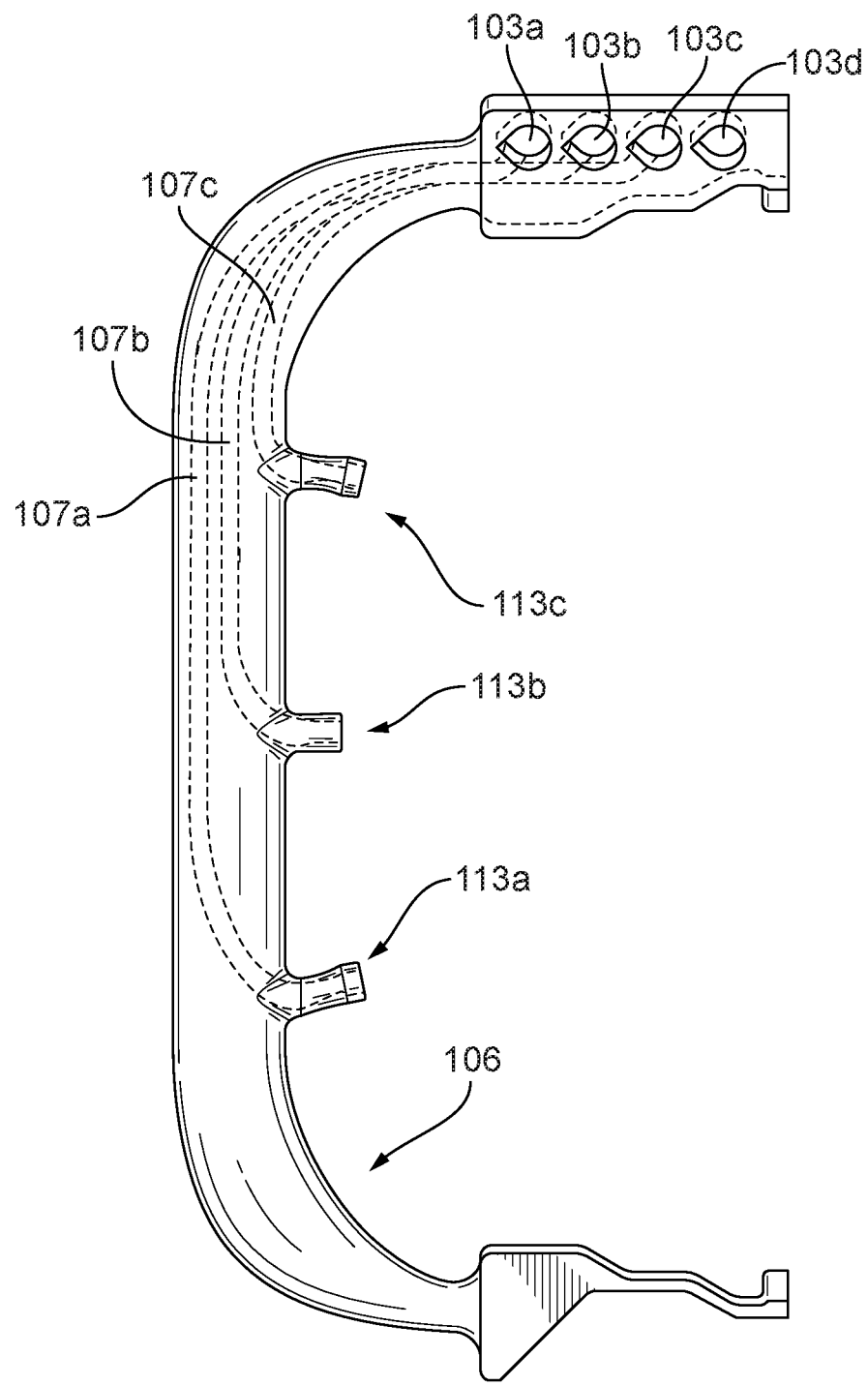
FIG. 6 is a see-through schematic view of the cutaway section of FIG. 3, showing internal branch fuel channels.
Figure 7:
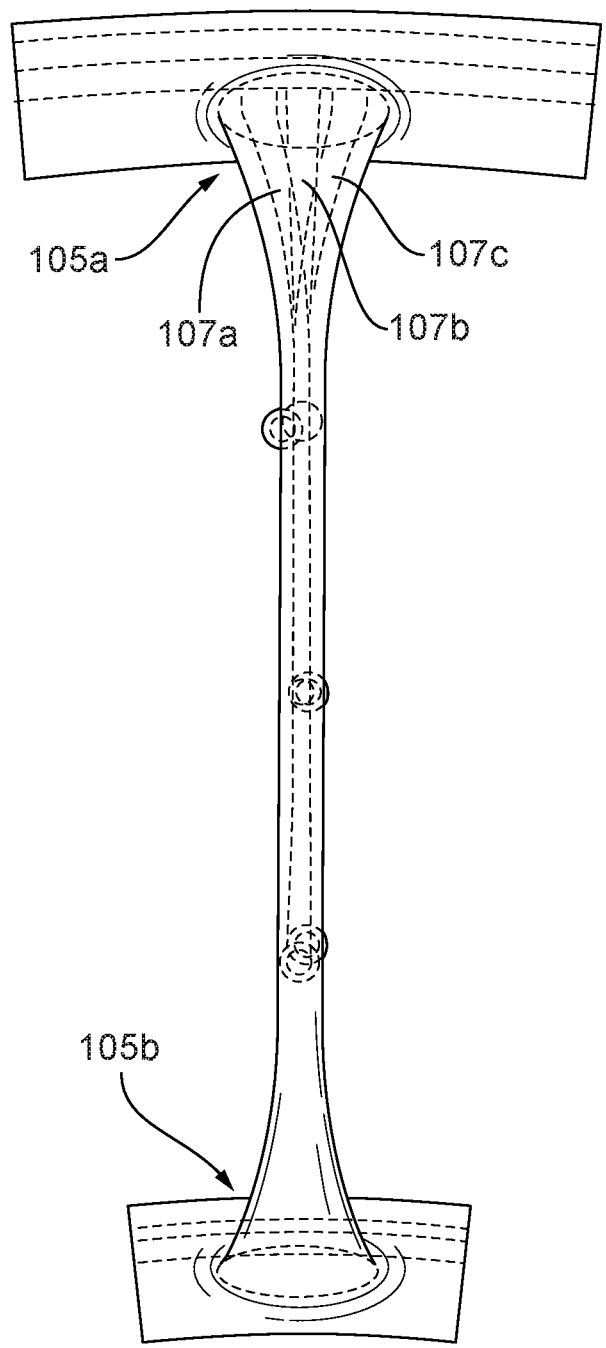
FIG. 7 is an aft view of the cutaway section of FIG. 6.

Referring additionally to FIGS. 6 and 7, the plurality of injector branches 105 can each include one or more branch fuel channels 107a, 107b, 107c in fluid communication with at least one of the one or more fuel supply channels 103, 103b, 103c, 103d.

The manifold 100 can include an inner ring 109 (e.g., defined by a plurality of inner ring segments 111) extending from the plurality of injector branches 105. The inner ring 109 can be segmented to accommodate thermal expansion such that the inner ring 109 is comprised of detached segments 111. Any other configuration for the inner ring 109 is contemplated herein. The inner ring 109 and the outer ring 101 can be configured to receive a fuel injector and combustor assembly (e.g., as shown in FIGS. 9-16) therebetween and to allow retaining of the fuel injector assembly and combustor assembly to the internal fuel manifold 100. The inner ring and/or the a bottom portion 106 of one or more branches 105 (e.g., radially inward of the most radially inward branch channel 107a) can be solid to improve stiffness, for example.

In certain embodiments, one or more of the injector branches 105 can include a pull handle shape as shown such that the branch 105 extends axially forward from the outer ring 101 and the inner ring 109. Each injector branch 105 can include the same shape, or any suitable injector branches 105 can have different shaped. One or more branches 105 can include an enlarging profile at the bases 105a, 105b thereof which can contributes to stiffness. The shape of the injector branches 105 can be optimized for weight and/or air blockage reduction and to have sufficient structural strength. The injector branches 105 can include any suitable shape.

The manifold 100 includes one or more injector connectors 113a, 113b, 113c extending axially backward from each injector branch 105. Each injector connector is in fluid communication with a branch fuel channel 107a, 107b, 107c and is configured to connect to a fuel injector (e.g., as shown in FIGS. 10-15).

In certain embodiments, the one or more branch fuel channels 107a, 107b, 107c can include a plurality of branch fuel channels 107a, 107b, 107c as shown (e.g., all injector branches 105 can include the same number, type, and/or pattern or any other suitable number, type, or pattern). The at least one or more injector connectors 113a, 113b, 113c can include a plurality of injector connectors 113a, 113b, 113c, for example. As shown, each branch fuel channel 107a, 107b, 107c can be connected to a respective injector connector 113a, 113b, 113c, respectively, for example.

The one or more fuel supply channels 103a, 103b, 103c, 103d can include a plurality of fuel supply channels 103a, 103b, 103c, 103d, e.g., as shown. For example, the plurality of fuel supply channels 103a, 103b, 103c, 103d can include at least as many fuel supply channels 103a, 103b, 103c, 103d as there are branch fuel channels 107a, 107b, 107c in each branch 105 such that each injector connector 113a, 113b, 113c can be supplied with fuel independent of other injector connectors 113a, 113b, 113c on the same branch 105. In this regard, each fuel injector connector 113a, 113b, 113c can be independently supplied with fuel allowing control over each fuel injector (e.g., as shown in FIGS. 9-16) connected thereto which can allow for more efficient control and operation of the combustor.

In certain embodiments, as best shown in FIG. 2, the plurality of injector connectors 113a, 113b, 113c can be disposed radially along the branch to form circumferential rows 115a, 115b, 115c with injector connectors 113a, 113b, 113c of other branches 105. In certain embodiments, as shown in FIGS. 3 and 5, each of the plurality of injector connectors 113a, 113b, 113c can extend from the branch 105 in a different direction.

Figure 8:
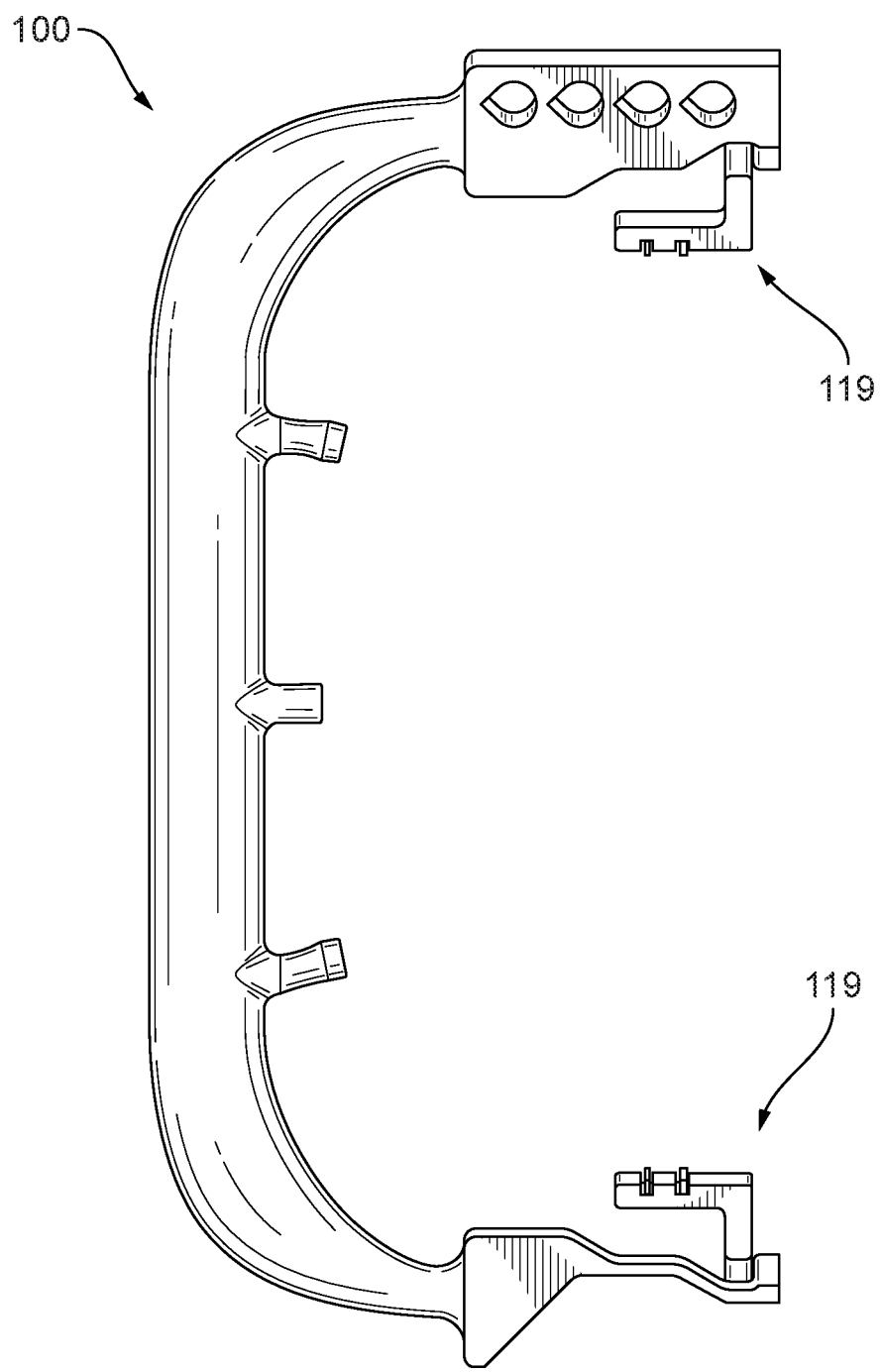
FIG. 8 is a side elevation view of a cutaway section of the embodiment of FIG. 1, showing flex rings disposed therein.
Figure 9:
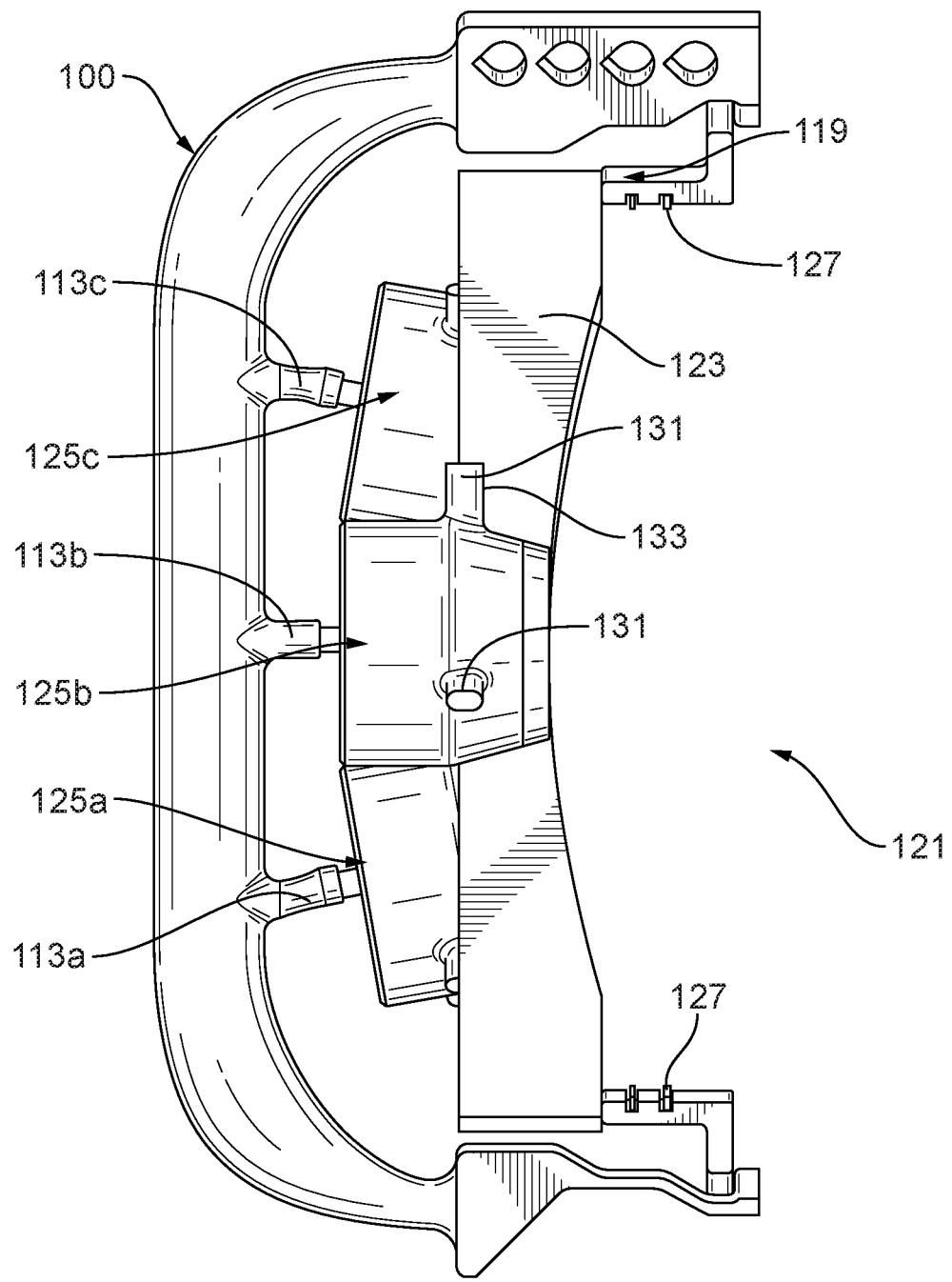
FIG. 9 is a side elevation view of a cutaway section of the embodiment of FIG. 8, showing fuel injectors connected to the manifold and retained within the manifold by the flex rings.

Referring to FIGS. 5 and 8-9, the outer ring 101 and the inner ring 109 can define a bayonet flange 117 (and/or any other suitable connection interface) for connecting the fuel injector assembly using one or more retainer rings 119, e.g., as shown in FIGS. 8-9. In accordance with at least one aspect of this disclosure, a fuel injector system 121 can include a fuel manifold 100 as disclosed herein, a combustor dome 123 mounted to the fuel manifold 100 with one or more retainer rings 119, and a plurality of fuel injectors 125a, 125b, 125c disposed in the combustor dome 123. Each fuel injector 125a, 125b, 125c can be connected to a fuel injector connector 113a, 113b, 113c of the fuel manifold 100 and be configured to mix air and fuel. The fuel injectors 125a, 125b, 125c can be arranged in circumferential rows in certain embodiments to align with a corresponding fuel injector connector 113a, 113b, 113c. As shown, e.g., in FIGS. 11 and 15, the fuel injectors 125a, 125b, 125c can be positioned such that minimal, if any, air blockage from the branches 105 is experienced. For example, the fuel injectors 125a, 125b, 125c may not pass under the branches 105. In certain embodiments, the combustor dome 123 can be made of a ceramic composite or any other suitable material, and other components can be made of any suitable material such as a suitable metal, ceramic, or composite, for example.

Figure 10:
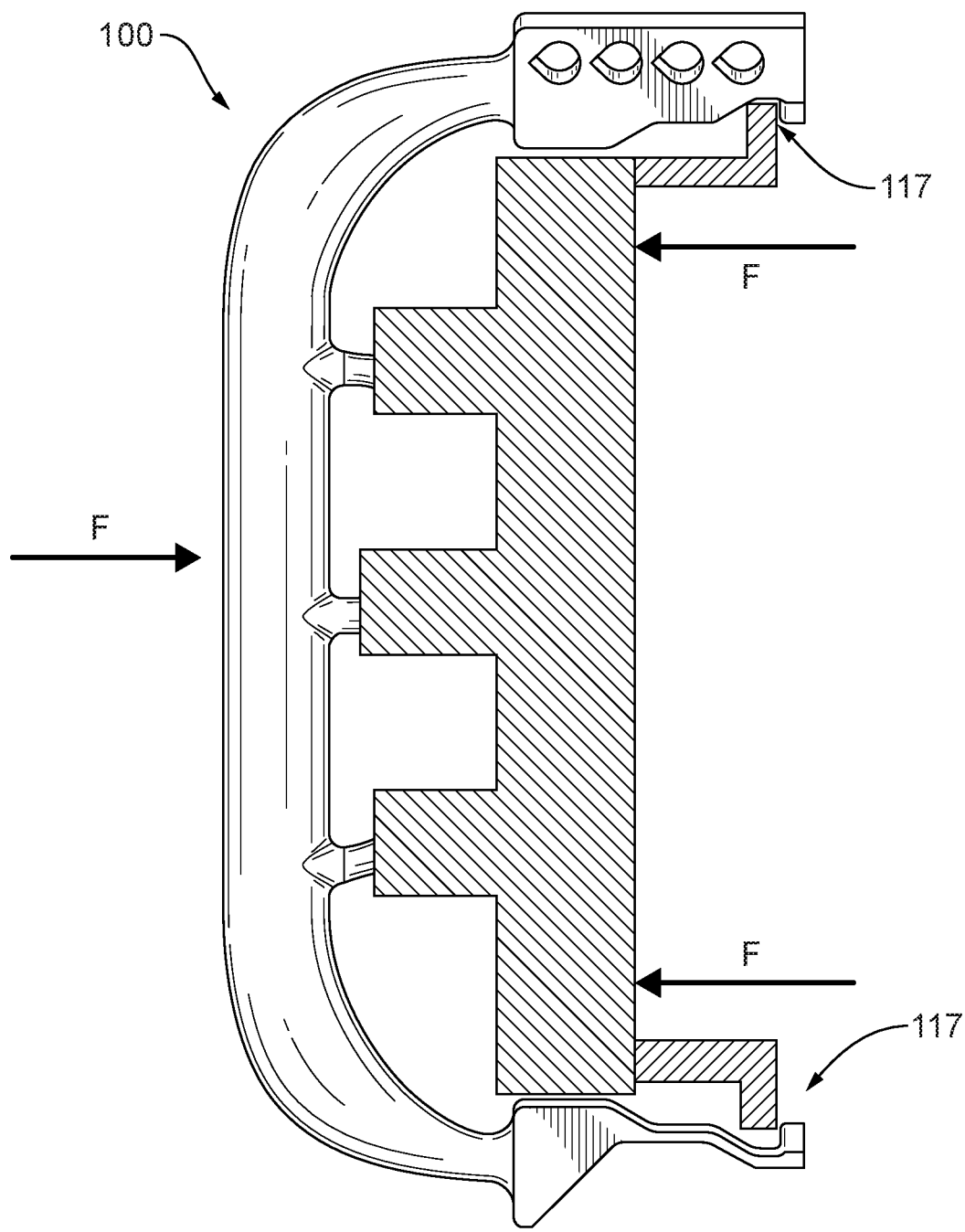
FIG. 10 is a side elevation schematic view of the cutaway section of the embodiment of FIG. 9, showing a force schematic of the installed components within the fuel manifold.

Referring additionally to FIG. 10, in certain embodiments, the combustor dome 123 can be mounted to the fuel manifold 100 with one or more (e.g., two as shown) retaining rings 119 which press against the combustor dome 123 to provide positive force to engage each fuel injector 125a, 125b, 125c with each fuel injector connector 113a, 113b, 113c. In certain embodiments, the two retainer rings 119 can include combustor seals 127. The retainer rings 119 can be an elastic element configured to provide compressive force (e.g., a c-seal) shaped to operate as a bayonet fitting (e.g., by inserting and turning) to lock in place and provide compression.

Figure 12:
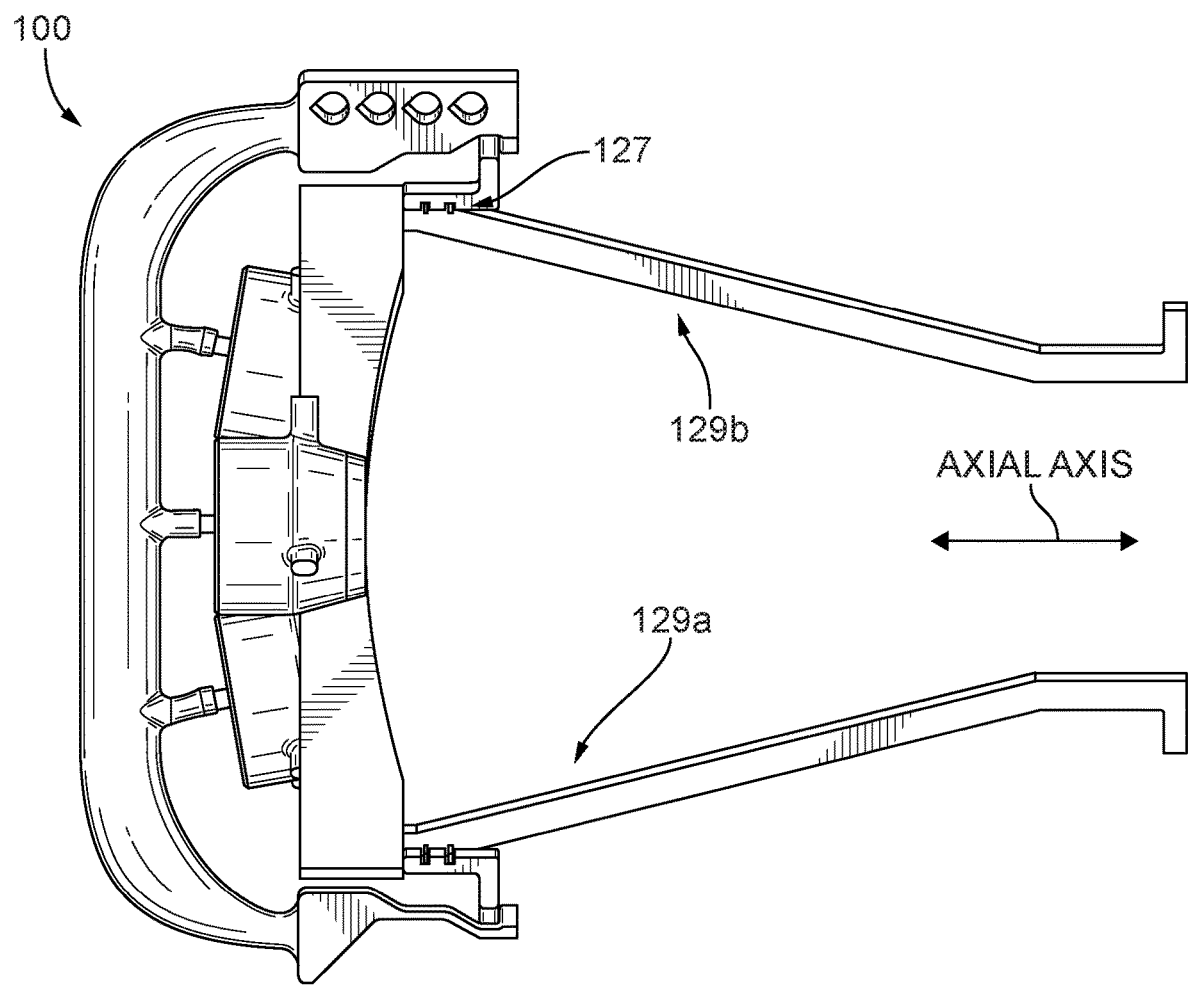
FIG. 12 is a side elevation view of a cutaway section of the embodiment of FIG. 9, showing a combustor liner disposed within the flex rings.

As shown in FIG. 12, the system 121 can include a combustor liner 129a, 129b (e.g., comprised of an inner combustor cone 129a and an outer combustor cone 129b) disposed between the retainer rings 119 in contact with the combustor seals 127. In certain embodiments, the combustor liner 129a, 129b can be a short, largely featureless device compared to traditional combustors because the dome 123 can admit all combustion air needed.

The plurality of fuel injectors 125a, 125b, 125c can be disposed in the combustor dome 123 in a plurality of circumferential rows as shown to allow radial fuel staging. In certain embodiments, each fuel injector 125a, 125c in a radially outward row and radially inward row can be angled relative to an axial axis to effuse fuel and air into the combustor liner 129a, 129b parallel to or away from walls of the combustor liner to prevent impingement on the walls of the combustor liner 129a, 129b.

Figure 11:
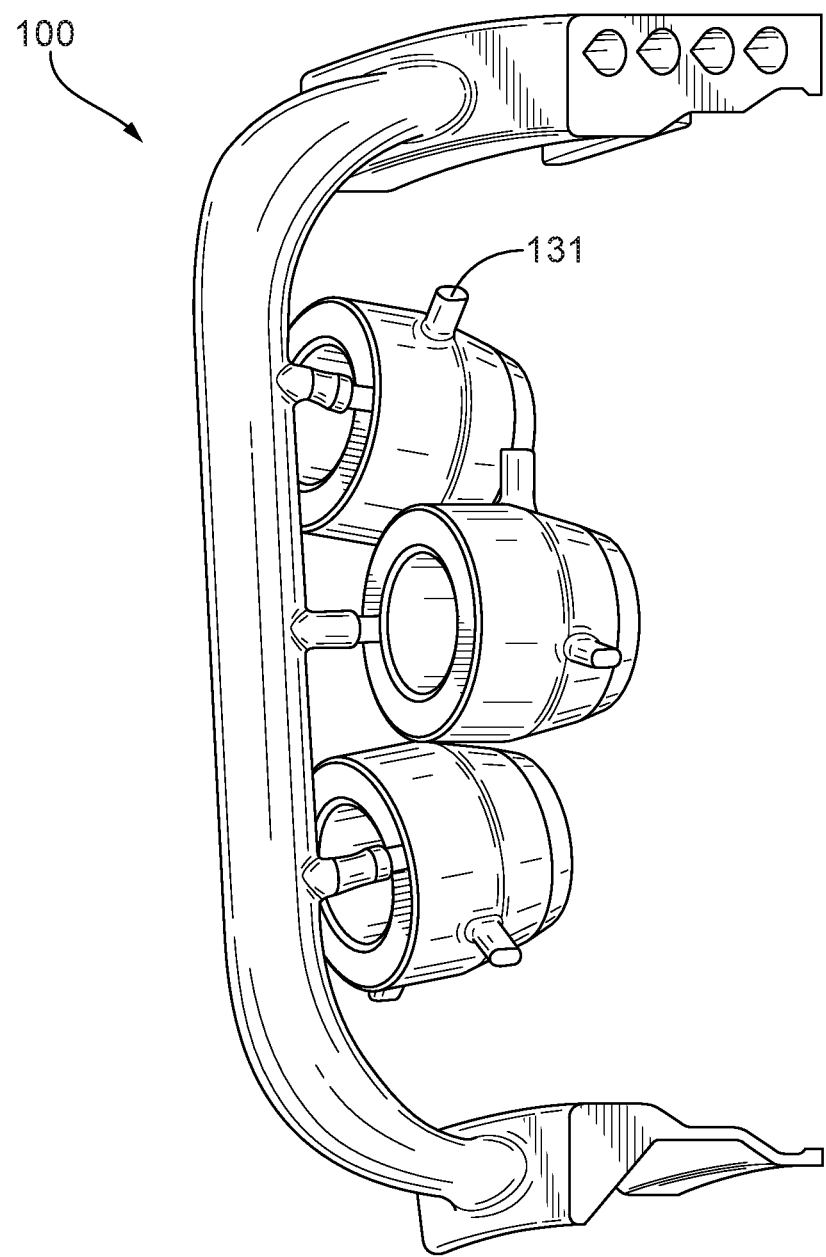
FIG. 11 is a perspective view of the cutaway section of the embodiment of FIG. 9, showing isolated fuel injectors connected to the injector branch.

As shown in FIGS. 11 and 12, each of the fuel injectors 125a, 125b, 125c can include one or more standoff features 131 configured to mate with one or more locator apertures 133 defined in the combustor dome 123 to orient each fuel injector 125a, 125b, 125c on the combustor dome 123 to such that each fuel injector 125a, 125b, 125c aligns with each fuel injector connector 113a, 113b, 113c. In certain embodiments, the plurality of fuel injectors includes 125a, 125b, 125c about 90 or more fuel injectors (e.g., about 180, about 250, or any large number of injection points).

Traditional systems typically only include 12 to 24 injection points at most. More injection points allow more control on how fuel and air are mixed, which allows much more efficient combustion and faster mixing (e.g., as a function of axial length) which allows combustor system to be shortened axially. This reduces size and weight of the turbomachine.

Any suitable components can be manufactured in any suitable manner. For example, one or more components (e.g., the manifold 100) may be additively manufactured. Embodiments include three or more (e.g., four) separately controlled fuel channels to control flow volume to the nozzles. Individual channels can connect the main manifold to fuel injectors. For example, in some embodiments, each channel feeds different "radial row" (a row defined by a circumferential line). As shown, the fourth channel 101d can be reserved to have pilot flow channels connected, e.g., for minimum fuel to maintain light. For example, in every other branch, the middle row can be connected to fourth channel 101d, or any other suitable pattern or arrangement (e.g., a single branch and/or any other suitable nozzle location). Any suitable configuration is contemplated herein.

Reduction of air flow blockage can be accomplished by thin struts containing the fuel channels. The branches can be stiffened and strengthened by the out and inner ring elements which can act as clasps to attach the combustor segments. The combustor openings can be located relative to these rings rather than the out case.

Figure 15:
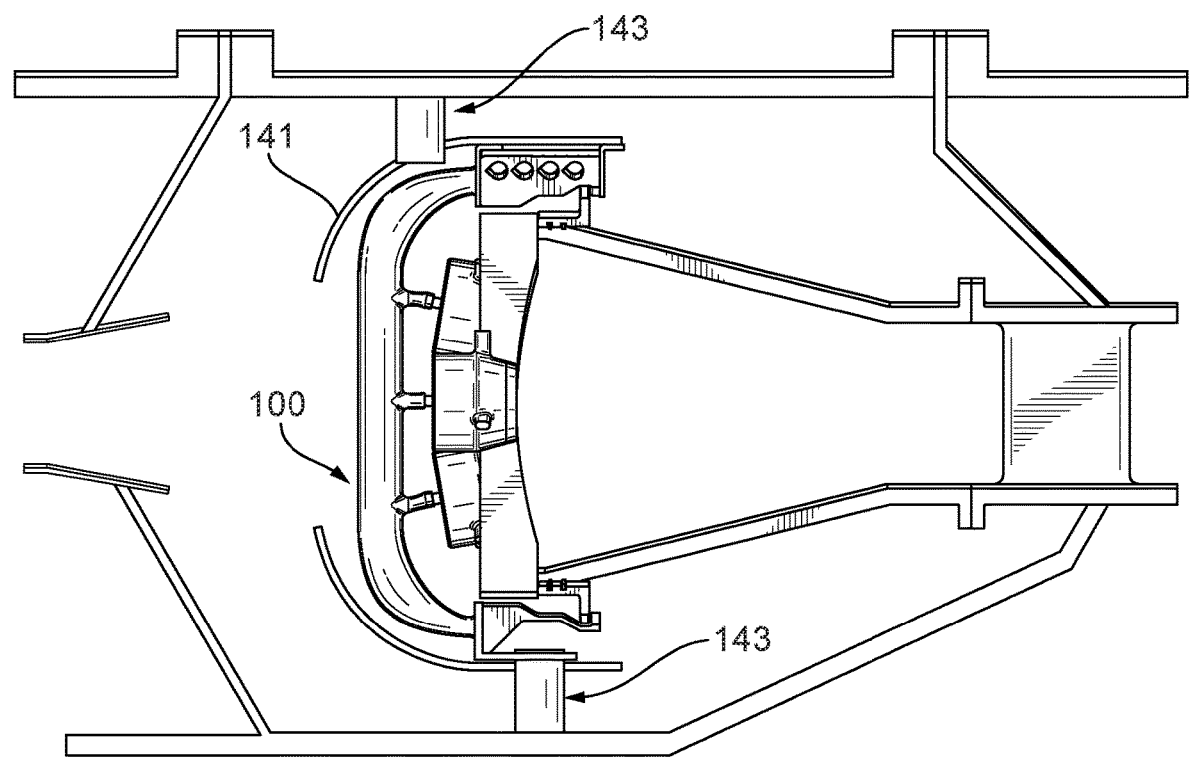
FIG. 15 is a side elevation view of a cutaway section of an embodiment of fuel injector assembly in accordance with this disclosure, shown within a turbomachine casing.

Referring to FIG. 15, a cowling 141 (e.g. a pressure recovery cowling) can provide a support structure 143 and heat shielding. As shown, the manifold 100 can attach to the cowling 141 and/or support structure 143 in any suitable manner.

Figure 16:
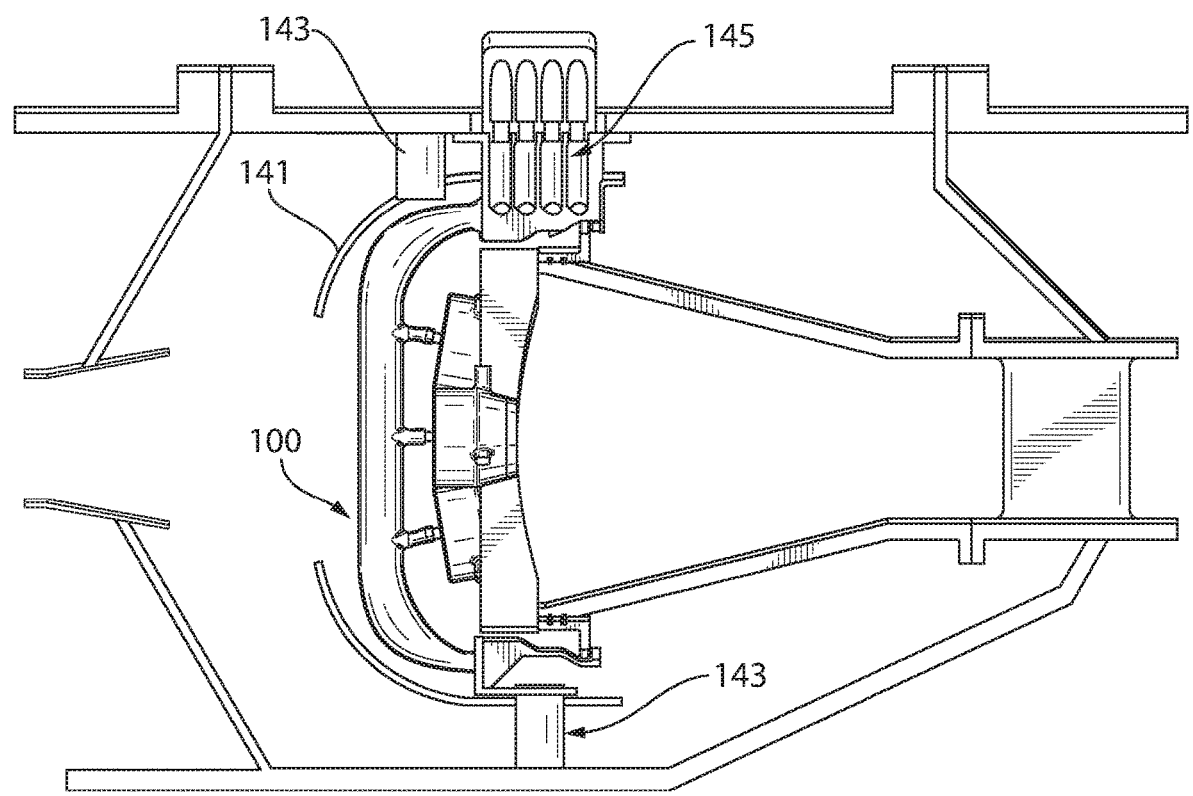
FIG. 16 is a side elevation view of a cutaway section of an embodiment of fuel injector assembly in accordance with this disclosure; shown within a turbomachine casing.

Referring to FIG. 16, fuel inlets 145 can connect to external fuel lines in one or more locations around the circumference of the outer ring 101 of the manifold. Each inlet channel can be separately controlled to provide independent fuel flow in each channel.

Figure 13:
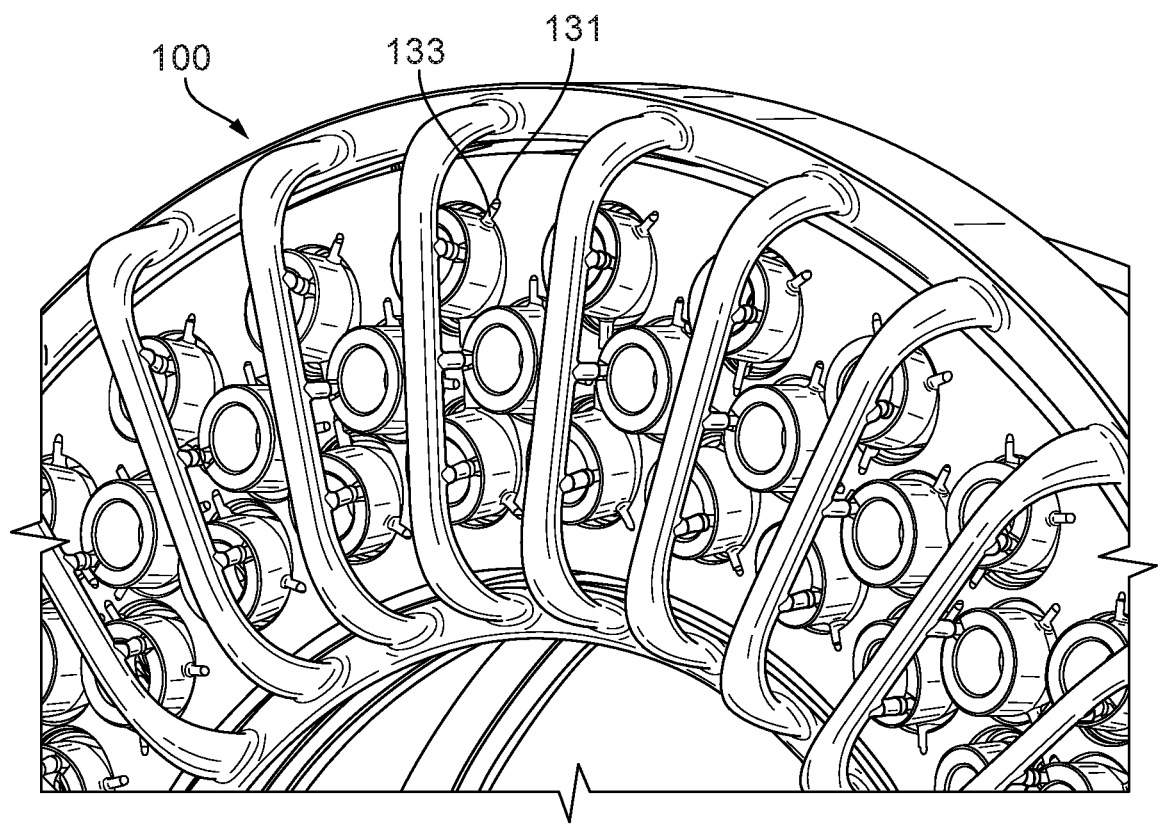
FIG. 13 is a partial perspective view of an embodiment of a fuel injector assembly in accordance with this disclosure.
Figure 14:
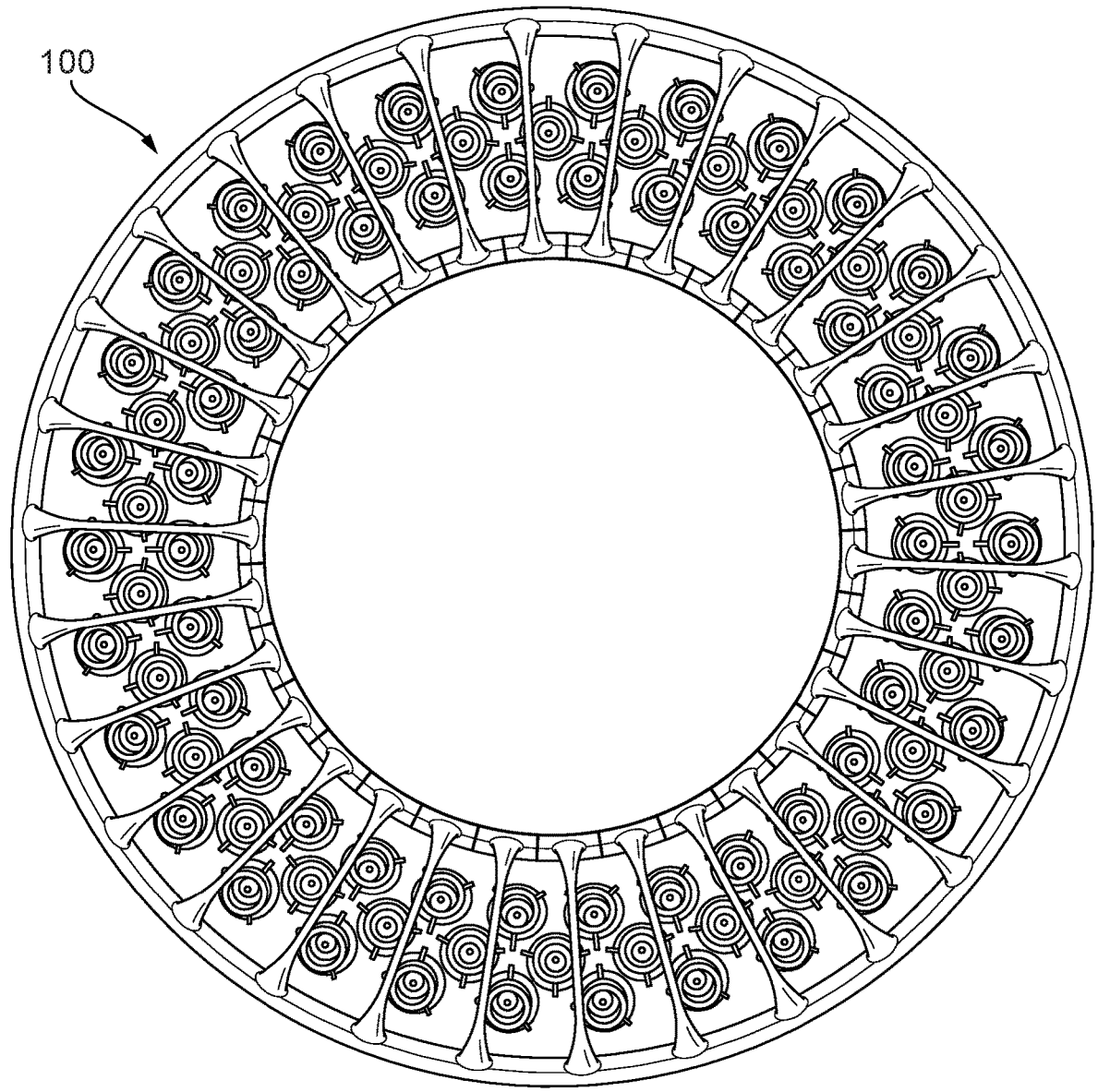
FIG. 14 is a plan view of the embodiment of FIG. 13.

In embodiments, a multi-point injection arrangement offers outstanding combustion performance without premixing. FIGS. 13 and 14 shows a high density of injectors, which on top of increased efficiency, also causes cooling of the combustor dome 123. Using embodiments, the turbine will see much more uniform heat distribution by having more injection points than traditional systems, for example.

Embodiments of a manifold locate individual injectors closely to combustor dome and allow reduction of fuel impingement on walls of the combustor. The branches 105 can also be shaped such that they remove swirl from compressor air due to their shape (e.g., like a flat stator) which can be beneficial for each nozzle to function.

Embodiments offer a fully assembled structure that is stiff but offers minimal blockage to air flow. Embodiments of the fuel injection system are integrated into combustor design. Embodiments include a combustor that is dramatically reduced in length (e.g., reduced by half or more). For example, large dome flow reduces combustor hot wall length and reduces composite material cost and weight, eliminates combustor holes and complexity, and improves durability. Embodiments can operate at high temperatures with low emissions combustion which can suit advanced, high pressure engines, for example.

Embodiments include an internal fuel manifold integrated with the combustor support, air cowls and combustor dome tiles, and large diameter nozzle air flow channels integrated into dome tiles to maximize the backside cooling by the combustion air prior to entering the combustor. Embodiments include increased injection sites which can permit very rapid mixing allowing for extremely short combustors. Embodiments allow holes in the high pressure casing to be minimized due to reduced engine weight. Embodiments allow radial fuel staging that can permit radial temperature profile control for the turbine. Embodiments allow extremely low temperature pattern factor that can be achieved for the turbine. Embodiments allow extremely low emissions to be achieved. Embodiments include very high durability, low cost mixers and better mechanical integration with the combustor.

Embodiments include a gas turbine combustor featuring ceramic construction and a metallic internal manifold. Certain embodiments can require means of slidingly attaching the manifold 100 and combustor dome 123 components together. Embodiments form an integrated fuel injector/combustor structure.

Figure 17:
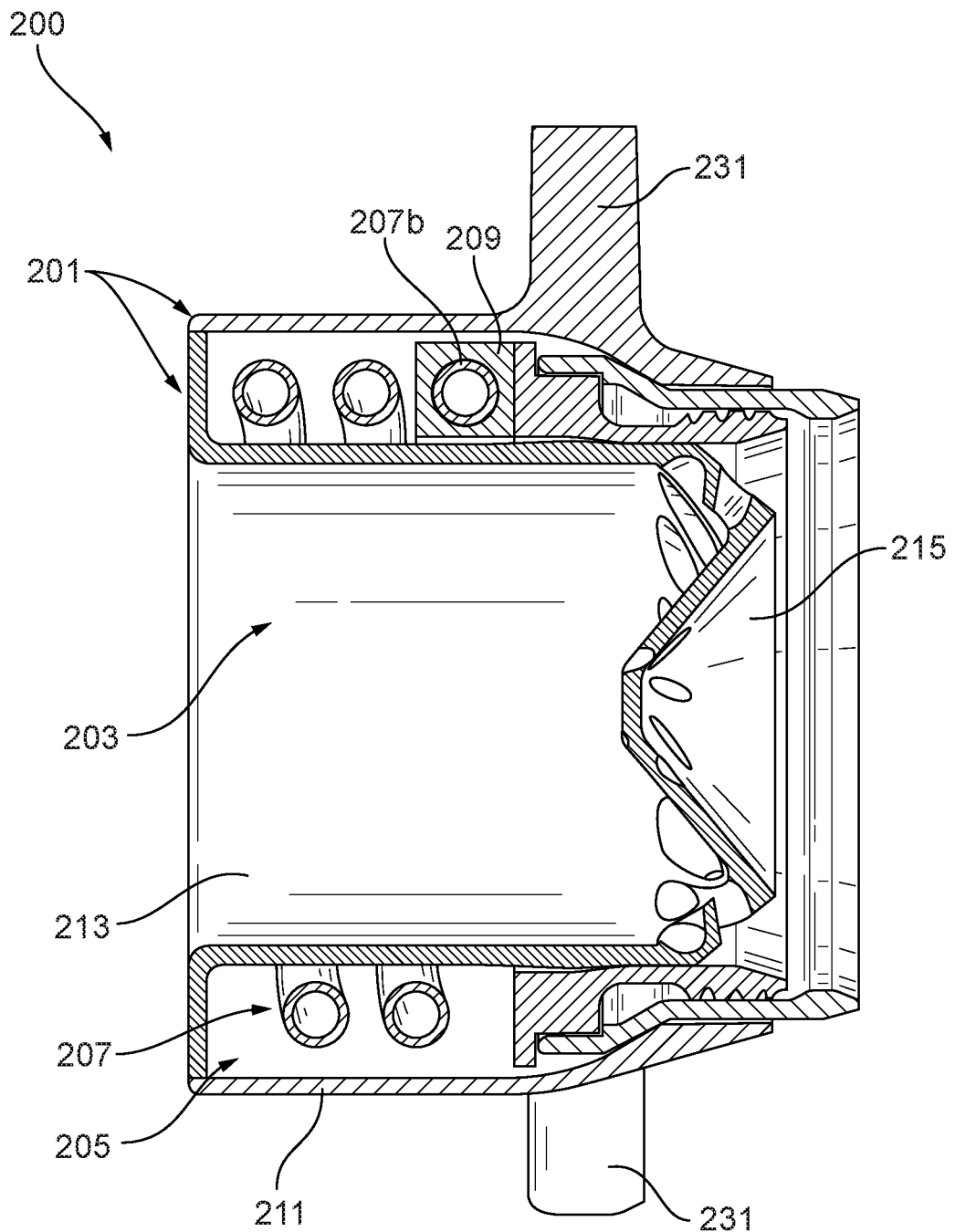
FIG. 17 is a cross-sectional view of an embodiment of a fuel injector in accordance with this disclosure, showing the connection between a fuel injector connector and a fuel tube.

In accordance with at least one aspect of this disclosure, referring to FIG. 17, a fuel injector 200 for a multipoint injection system can include a body 201 defining an air cavity 203 for allowing air to flow therethrough and an interior cavity 205. A fuel tube 207 is disposed at least partially within the interior cavity 205 of the body 201.

Figure 18:
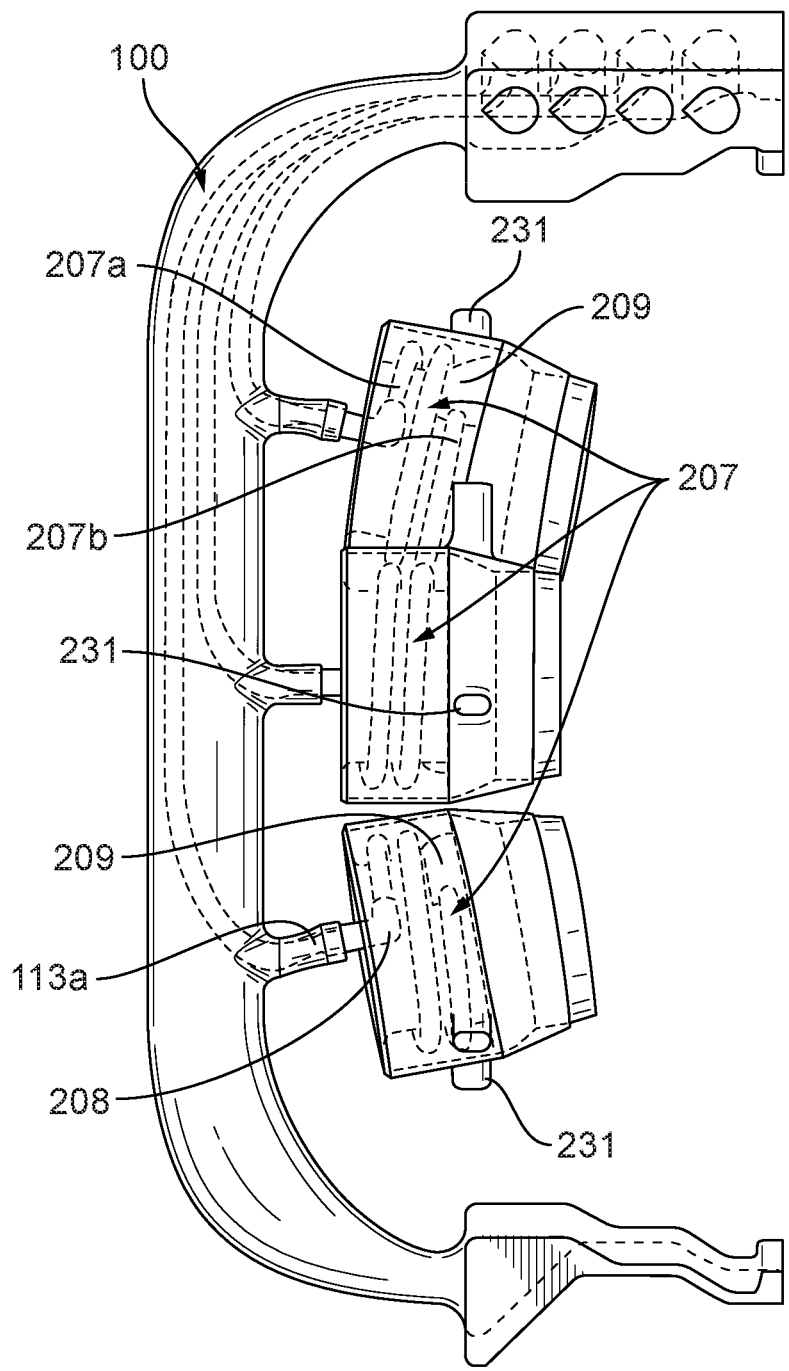
FIG. 18 is a schematic view of a plurality of fuel injectors of FIG. 17 connected to a fuel manifold in accordance with this disclosure.

Referring additionally to FIG. 18, the fuel tube 207 can include a first end 207a configured to connect to a fuel injector connector (e.g., 113a, 113b, 113c) of a fuel manifold (e.g., manifold 100 as described above). In certain embodiments, the first end can include an elbow 208 configured to mate with a fuel injector connector (e.g., 113a, 113b, 113c). In certain embodiments, the elbow 208 can be a separate component and/or made of thicker and/or stronger material than the fuel tube 207.

The fuel tube 207 can include a second end 207b configured to connect to a fuel distributor 209 of the fuel injector 200. The fuel injector 200 is configured to be disposed at least partially in a combustor dome (e.g., combustor dome 123). The fuel tube is configured to move in an axial direction (e.g., a centerline of the fuel injector 200) to allow flexibility between the fuel manifold (e.g., manifold 100) and the combustor dome (e.g., combustor dome 123).

The fuel tube 207 can be a coiled fuel tube 207. The coiled fuel tube 207 can be configured to axially compress and/or expand between the first end 207a and the second end 207b (e.g., like a spring). As shown, the coiled tube 207 can be contained within the interior cavity 205 of the fuel injector 200.

The body 201 can be formed from an outer heat shield 211 and an inner heat shield 213 disposed within the outer heat shield 211. The inner heat shield 213 can at least partially define the air cavity 203.

In certain embodiments, the outer heat shield 211 and the inner heat shield 213 can be integrally formed together (e.g., via additive manufacturing). In certain embodiments, the outer heat shield 211 and the inner heat shield 213 can be separate components. The interior cavity 205 can be formed between the outer heat shield 211 and the inner heat shield 213 such that the coiled fuel tube 207 is disposed between the outer heat shield 211 and the inner heat shield 213.

The outer heat shield 211 can include one or more standoff features 231, e.g., such as features 131 described above, for orienting the fuel injector 200 on the combustor dome (e.g., to align with a fuel injector connector 113a, 113b, 113c of a fuel manifold 100). The one or more standoff features 231 can include three standoff features, for example.

The fuel distributor 209 can be disposed at least partially within the interior cavity 205 defined between the outer heat shield 211 and the inner heat shield 213. In certain embodiments, the inner heat shield 213 can include an integral air swirler 215. In certain embodiments, the air swirler 215 can be a separate component and placed in any suitable location within the air cavity 203. Any other suitable component(s) and/or configuration(s) is/are contemplated herein.

Figure 19:
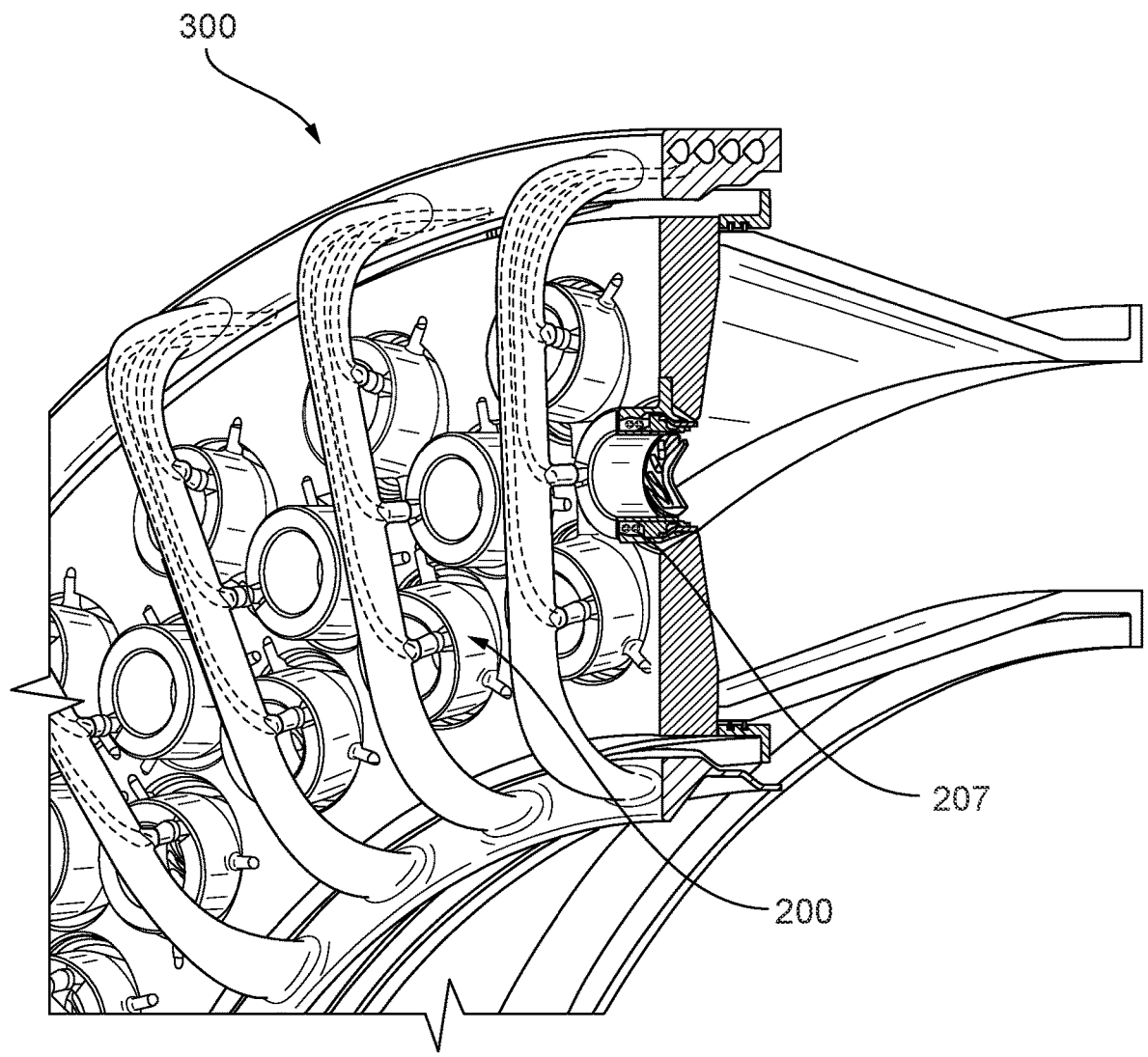
FIG. 19 is a cross-sectional perspective view of an embodiment of a system in accordance with this disclosure.
Figure 20:
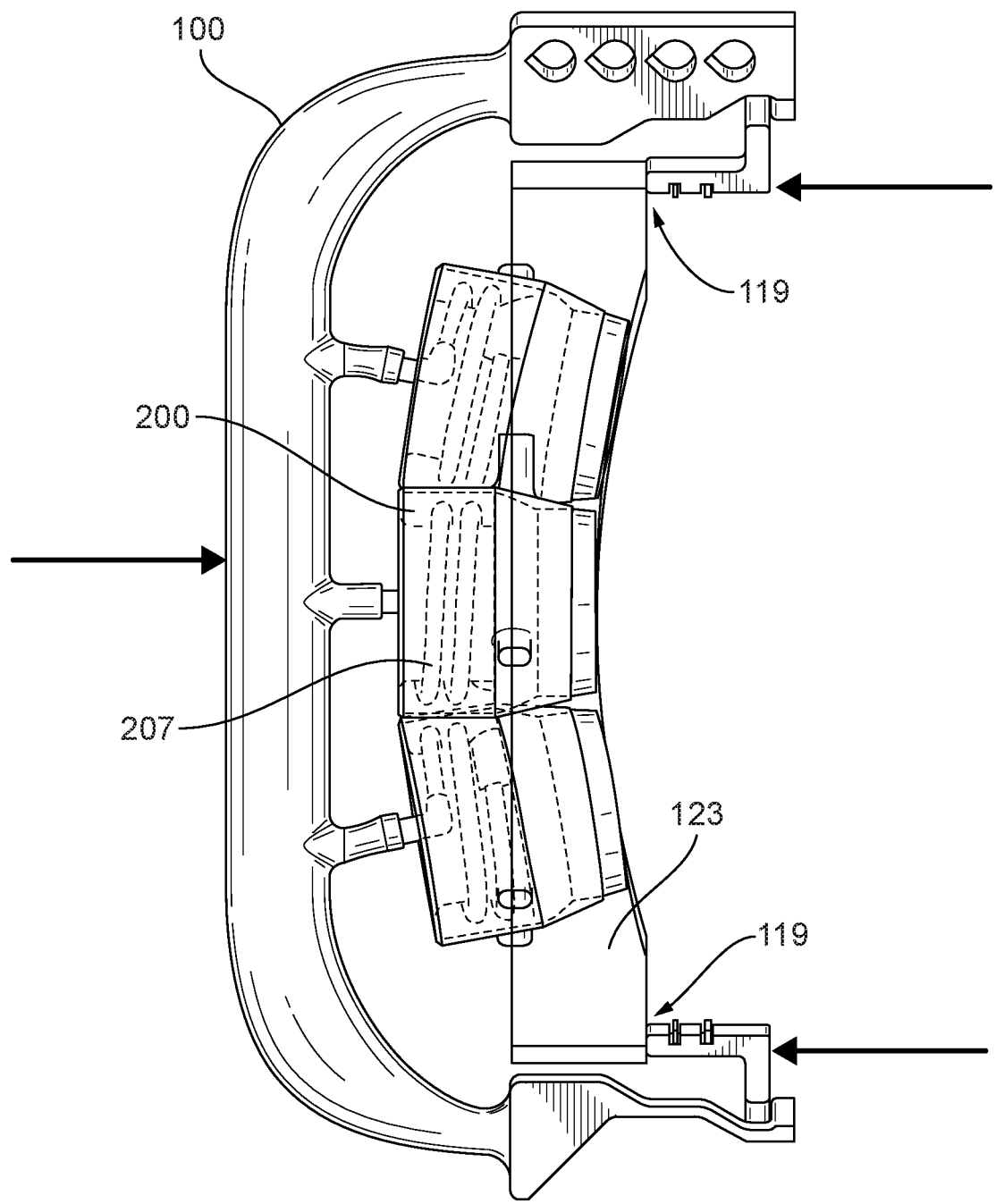
FIG. 20 is a side elevation schematic view of the cutaway section of the embodiment of FIG. 19, showing a force schematic of the installed components within the fuel manifold.
Figure 21:
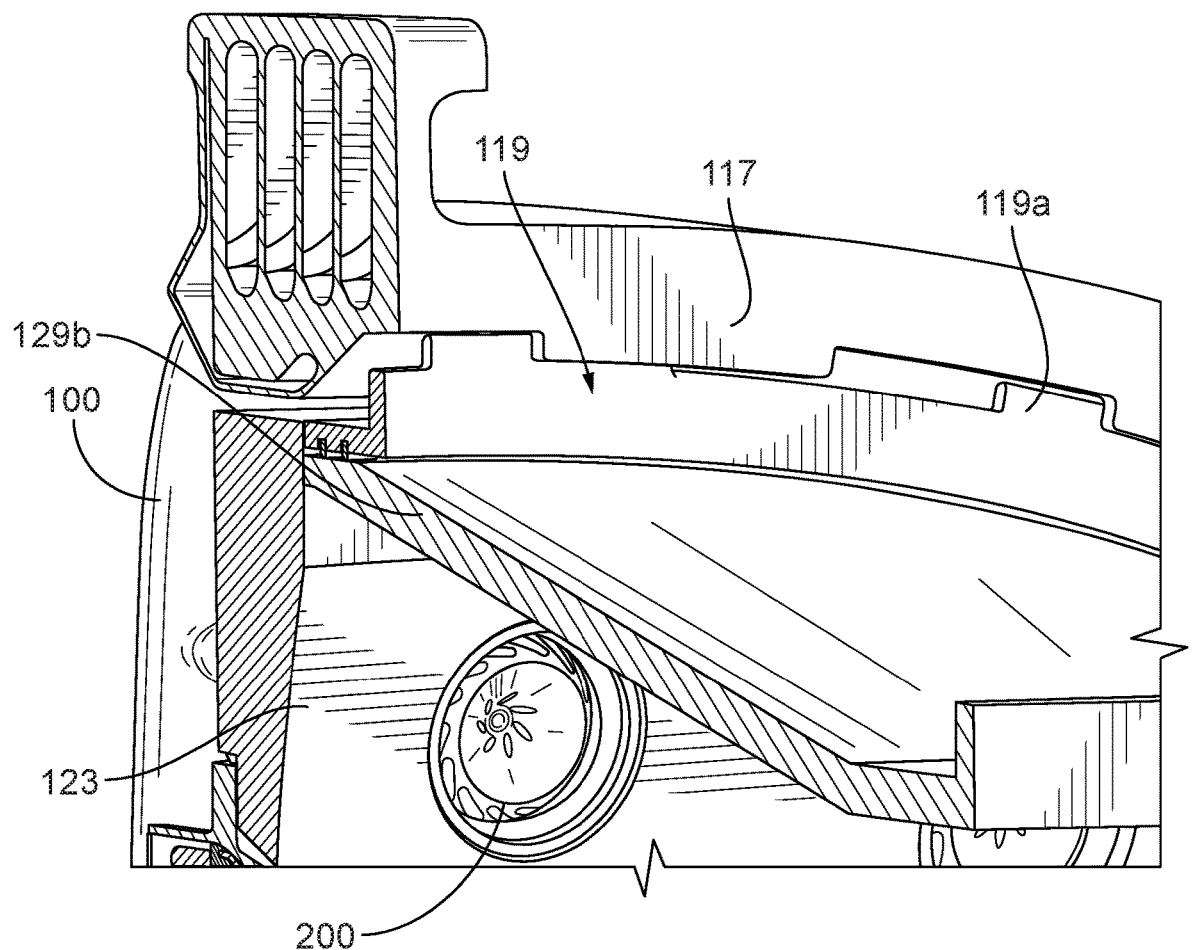
FIG. 21 is a cross-sectional perspective view of the embodiment of FIG. 19, showing bayonet flanges and a retainer ring of the system.

Referring additionally to FIGS. 19-21, a fuel injector system 300 can include a fuel manifold 100, a combustor dome 123 mounted to the fuel manifold 100 with one or more retainer rings 119 (e.g., bayonet rings), and a plurality of fuel injectors 200 as described above disposed in the combustor dome 123. Each fuel injector 200 is connected to a fuel injector connector 113a, 113b, 113c of the fuel manifold 100 and is configured to mix air and fuel. The system 300 and/or any components thereof (e.g., the manifold 100, the combustor dome 123, the retainer rings 119, the combustor 129a, 129b) can be the same or similar to the system as described above.

Referring to FIG. 20, a compressive force between the combustor dome 123 and the fuel manifold 100 squeezes the fuel tube 207 together, and therefore thermal movement or other movement between the rigid fuel manifold 100 and the rigid combustor dome 123 is tolerated. Referring to FIG. 21, the outer retainer ring 119 is shown disposed in and rotated into the bayonet flange 117 of the fuel manifold 100 to provide a compressive forced between the fuel manifold 100 and the combustor dome 123.

As shown, the retainer rings 119 can be bayonet rings with bayonet extensions 119a that can be inserted into a gap between the bayonet flanges 117 and then rotated to engage with the bayonet flanges 117. In certain embodiments, the retainer rings 119 can be pinned circumferentially for anti-rotation after assembly.

In embodiments the internal manifold can be made of stiff metallic materials which are normally fuel cooled in operation. However, the manifold must co-exist with extremely hot metallic or ceramic composite combustor. Embodiments provide elasticity to the combustor assembly through the use moveable fuel tubes (e.g., coiled fuel tubes which can provide adequate spring forces). Embodiments include a flexible element in the fuel injector to allow for dimensional adjustments. Dimensions of the coiled fuel tube (e.g., number of winds, diameter of tube, material, etc.) can be selected to require axial preload during assembly (e.g., which can produce a positive engagement to lock the components of the combustor/fuel injection system together).

Embodiments provide spring force for installation of bayonet clips and for thermal growth. In embodiments, a force can travel through the injector connector to the elbow connected to the coil fuel tube, then act on the fuel tube to compress against the fuel distributor. In embodiments, everything else can be mounted rigidly to combustor dome.

Compressive force during assembly can be used to produce elastic spring force from fuel tubes to help maintain axial seal. In embodiments, an advanced combustor front end can be constructed of hard ceramic and metallic components most of which will be hot and the fuel carrying tubes can be cool (less than 300 F). Embodiments using fuel tube embodiments as disclosed herein provides elastic force which can be utilized for combustor/fuel manifold assembly (fastening) and can provide axial force to maintain combustor air seals during operation.

Any suitable combination(s) of any disclosed embodiments and/or any suitable portion(s) thereof is contemplated therein as appreciated by those having ordinary skill in the art.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A fuel injector for a multipoint injection system, comprising:

a body defining an air cavity for allowing air to flow therethrough and an interior cavity;

a fuel tube disposed at least partially within the interior cavity of the body, wherein the fuel tube includes a first end configured to connect to a fuel injector connector of a fuel manifold, and a second end configured to connect to a fuel distributor of the fuel injector, wherein the fuel injector is configured to be disposed at least partially in a combustor dome, and wherein the fuel tube is configured to move in an axial direction to allow flexibility between the fuel manifold and the combustor dome, wherein the fuel tube is a coiled fuel tube, wherein the coiled fuel tube is contained within the interior cavity, wherein the body is formed from an outer heat shield and an inner heat shield disposed within the outer heat shield, wherein the outer shield is an annular wall extending in the axial direction, an axially extending portion of the annular wall covering the entirety of the coiled fuel tube.

2. The injector of claim 1, wherein the coiled fuel tube is configured to axially compress and/or expand between the first end and the second end.

3. The injector of claim 1, wherein the outer heat shield and the inner heat shield are integrally formed together, wherein the inner heat shield at least partially defines the air cavity.

4. The injector of claim 1, wherein the outer heat shield and the inner heat shield are separate components.

5. The injector of claim 1, wherein the interior cavity is formed between the outer heat shield and the inner heat shield such that the coiled fuel tube is disposed between the outer heat shield and the inner heat shield.

6. The injector of claim 1, wherein the outer heat shield includes one or more standoff features for orienting the fuel injector on the combustor dome, wherein the one or more standoff features are attached to and extend radially outward from the outer heat shield.

7. The injector of claim 5, wherein the fuel distributor is disposed at least partially within the interior cavity.

8. The injector of claim 6, wherein the one or more standoff features includes three standoff features.

9. A fuel injector system, comprising:
a fuel manifold;
a combustor dome mounted to the fuel manifold with one or more retainer rings; and
a plurality of fuel injectors disposed in the combustor dome, each fuel injector connected to a fuel injector connector of the fuel manifold and configured to mix air and fuel, each fuel injector comprising:

a body defining an air cavity for allowing air to flow therethrough and an interior cavity;

a fuel tube disposed at least partially within the interior cavity of the body, wherein the fuel tube includes a first end configured to connect to a fuel injector connector of a fuel manifold, and a second end configured to connect to a fuel distributor of the fuel injector, wherein the fuel injector is configured to be disposed at least partially in the combustor dome, and wherein the fuel tube is configured to move in an axial direction to allow flexibility between the fuel manifold and the combustor dome, wherein the combustor dome is mounted to the fuel manifold to provide positive force to engage each fuel tube with each fuel injector connector of the manifold, wherein an axially forward end of at least one of the one or more retainer rings is axially aft of the combustor dome.

10. The system of claim 9, wherein the combustor dome is mounted to the fuel manifold with two retaining rings of the one or more retainer rings, wherein the fuel manifold presses against the combustor dome to provide positive force to engage each fuel tube with each fuel injector connector of the manifold.

11. The system of claim 10, wherein the two retainer rings include combustor seals.

12. The system of claim 11, further comprising a combustor liner disposed between the two retainer rings in contact with the combustor seals.

13. The system of claim 9, wherein the plurality of fuel injectors are disposed in a plurality of circumferential rows to allow radial fuel staging.

14. The system of claim 13, wherein each fuel injector in a radially outward row of the plurality of circumferential rows and radially inward row of the plurality of circumferential rows are angled relative to an axial axis to effuse fuel and air into the combustor liner parallel to or away from walls of the combustor liner to prevent impingement on the walls of the combustor liner.

15. The system of claim 14, wherein each of the plurality of fuel injectors include one or more standoff features configured to mate with one or more locator apertures defined in the combustor dome to orient each fuel injector on the combustor dome such that each fuel injector aligns with each fuel injector connector.

16. The system of claim 9, wherein the plurality of fuel injectors includes 90 or more fuel injectors.

* * * * *